J. M. Dunn. Ditching Machine.

No. 119,334.  Patented Sep. 26, 1871.

Witnesses:
E. Wolff.
Wm. H. C. Smith.

Inventor:
J. M. Dunn.
per
Attorneys.

UNITED STATES PATENT OFFICE.

JOHN M. DUNN, OF ERIN, MISSISSIPPI.

IMPROVEMENT IN EXCAVATORS.

Specification forming part of Letters Patent No. 119,334, dated September 26, 1871.

*To all whom it may concern:*

Be it known that I, JOHN M. DUNN, of Erin, in the county of Calhoun and State of Mississippi, have invented a new and Improved Ditching-Machine; and I do hereby declare that the following is a full, clear, and exact description thereof, which will enable others skilled in the art to make and use the same, reference being had to the accompanying drawing forming part of this specification, in which—

Figure 1:
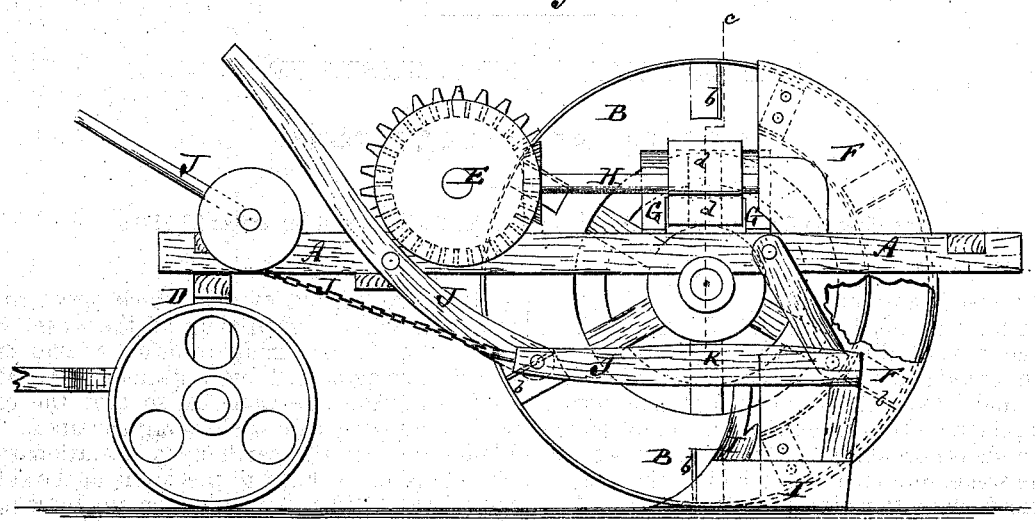
Figure 2:
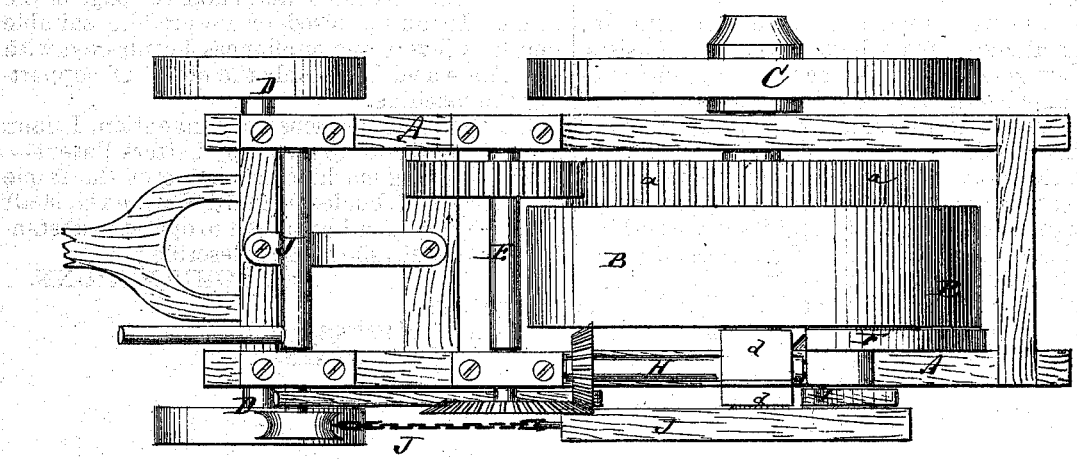
Figure 3:
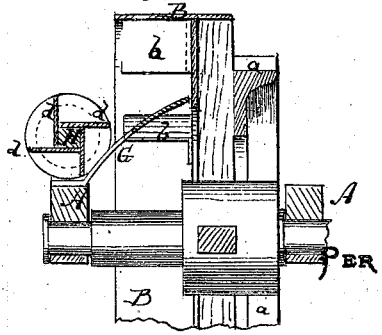

Figure 1 represents a side elevation of my improved ditching-machine. Fig. 2 is a plan or top view of the same. Fig. 3 is a detail vertical section of the same on the line $c\ k$, Fig. 1.

Similar letters of reference indicate corresponding parts.

This invention relates to a new machine for making ditches, canals, levees, &c.; and consists in a new general arrangement of digging and throwing-wheels, whereby the ground is taken up and thrown to the side, as hereinafter more fully described.

A in the drawing represents the frame of my ditching-machine. Its rear end is supported by two large wheels, B and C, and its front end by a small two-wheel truck, D. The wheel B has a broad treading-edge, from six to twelve inches in width, and carries a toothed wheel, $a$, at one side, for imparting motion to a cross-shaft, E. Within the rim of the wheel B is arranged a series of radial blades, $b\ b$, which serve to elevate the earth. That side of the wheel B on which the blades during rotation ascend is incased in or embraced by a stationary guard, F, projecting from the frame A, so that the earth will be properly held while being elevated. The blades deposit the earth upon a stationary inclined apron, G, fixed to the frame at the side of the wheel A, whence it is taken up by wings $d$ $d$ on a rotary horizontal shaft, H. This shaft derives its motion by gearing from the shaft E. The wings throw the earth to the side. The inclination of the apron G may be varied in accordance with the distance to which the earth is to be thrown. A plow, I, is hung to the side of the frame A, to determine and make the edge of the ditch. It can be raised or lowered to suitable depth by levers and appliances J connected with it. The wheel C has only the object of supporting the machine.

Having thus described my invention, I claim as new and desire to secure by Letters Patent—

The ditching-machine consisting of the frame A, wheels B C, blades $b$, guard F, apron G, shaft H, and wings $d$, all arranged to operate substantially as herein shown and described.

JOHN M. DUNN.

Witnesses:
A. T. HARPER,
J. W. BUCHANAN.